(12) United States Patent
Yandek et al.

(10) Patent No.: US 9,870,372 B2
(45) Date of Patent: *Jan. 16, 2018

(54) FAST APPLICATION STREAMING USING ON-DEMAND STAGING

(71) Applicant: Microsoft Technology Licensing, LLC, Redmond, WA (US)

(72) Inventors: Matthew R. Yandek, Boston, MA (US); Gurashish Singh Brar, Snoqualmie, WA (US); Hui Li, Malden, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/456,380

(22) Filed: Aug. 11, 2014

(65) Prior Publication Data

US 2014/0351301 A1 Nov. 27, 2014

Related U.S. Application Data

(63) Continuation of application No. 13/327,699, filed on Dec. 15, 2011, now Pat. No. 8,832,296.

(51) Int. Cl.
*G06F 17/30* (2006.01)
*G06F 9/445* (2006.01)
(Continued)

(52) U.S. Cl.
CPC .......... *G06F 17/30194* (2013.01); *G06F 8/65* (2013.01); *G06F 9/44521* (2013.01);
(Continued)

(58) Field of Classification Search
None
See application file for complete search history.

(56) References Cited

U.S. PATENT DOCUMENTS 5,953,729 A 9/1999 Cabrera et al.
6,918,113 B2 7/2005 Patel et al.
(Continued)

FOREIGN PATENT DOCUMENTS

CN 1467631 A 1/2004
CN 101799826 8/2010
(Continued)

OTHER PUBLICATIONS

"First Office Action and Search Report Issued in Chinese Patent Application No. 201210544617.0", dated May 27, 2015, 17 Pages.
(Continued)

*Primary Examiner* — Shirley Zhang
(74) *Attorney, Agent, or Firm* — Workman Nydegger

(57) ABSTRACT

Embodiments are directed to rapidly launching a virtual software application using on-demand file staging, rapidly launching a virtual software application using on-demand registry staging and to rapidly publishing a virtual software application using on-demand staging. In one scenario, a computer system creates a high-level file listing that includes a list of specified high-level data files and directories that are part of a virtual application package. The computer system receives an indication from an application user that the virtual application is to be accessed and dynamically creates sparse data files for those data files that are to be accessed based on the received indication. Then, upon determining that the virtual application is attempting to access the sparse data files, the computer system dynamically streams the data corresponding to the sparse data files on demand from the remote data store.

21 Claims, 5 Drawing Sheets

(51) Int. Cl.
*G06F 9/50* (2006.01)
*H04L 29/08* (2006.01)
*G06F 9/44* (2006.01)

(52) U.S. Cl.
CPC ...... *G06F 9/5077* (2013.01); *G06F 17/30153* (2013.01); *G06F 17/30197* (2013.01); *H04L 67/10* (2013.01); *G06F 8/60* (2013.01); *G06F 9/4416* (2013.01); *H04L 67/04* (2013.01); *H04L 67/08* (2013.01)

(56) References Cited

U.S. PATENT DOCUMENTS

| | | | |
|---|---|---|---|
| 7,451,196 B1* | 11/2008 | de Vries | G06F 8/61 709/220 |
| 7,577,751 B2* | 8/2009 | Vinson | G06F 9/445 709/203 |
| 7,987,335 B1 | 7/2011 | Dickinson | |
| 8,005,851 B2 | 8/2011 | Sheehan et al. | |
| 8,112,505 B1* | 2/2012 | Ben-Shaul | G06F 17/30168 709/217 |
| 8,131,825 B2* | 3/2012 | Nord | G06F 17/30067 709/219 |
| 8,495,625 B1* | 7/2013 | Sanders | G06F 8/60 717/174 |
| 8,509,230 B2* | 8/2013 | Vinson | G06F 9/445 370/389 |
| 8,527,706 B2* | 9/2013 | de Vries | G06F 12/0862 711/118 |
| 8,533,151 B2* | 9/2013 | McDiarmid | G06F 8/61 707/601 |
| 8,533,705 B2* | 9/2013 | Romm | G06F 9/44505 717/170 |
| 8,560,825 B2* | 10/2013 | Butler | G06F 9/4416 713/2 |
| 8,676,938 B2* | 3/2014 | Hitomi | H04L 65/105 709/203 |
| 8,726,269 B2* | 5/2014 | Chaganti | G06F 9/45533 711/6 |
| 8,831,995 B2* | 9/2014 | Holler | G06F 8/65 705/51 |
| 8,892,738 B2* | 11/2014 | de Vries | G06F 11/3476 702/179 |
| 9,141,934 B2* | 9/2015 | Shlomai | G06Q 10/10 |
| 2001/0034736 A1 | 10/2001 | Eylon et al. | |
| 2002/0087963 A1 | 7/2002 | Eylon et al. | |
| 2002/0133491 A1 | 9/2002 | Sim et al. | |
| 2003/0097400 A1 | 5/2003 | Li et al. | |
| 2004/0039889 A1 | 2/2004 | Elder et al. | |
| 2004/0111250 A1 | 6/2004 | Hensley et al. | |
| 2006/0031547 A1 | 2/2006 | Tsui et al. | |
| 2006/0036568 A1 | 2/2006 | Moore et al. | |
| 2006/0235871 A1* | 10/2006 | Trainor | G06F 17/30722 |
| 2008/0010382 A1 | 1/2008 | Ratakonda et al. | |
| 2008/0034408 A1 | 2/2008 | Duggal | |
| 2008/0059645 A1 | 3/2008 | Gregotski et al. | |
| 2008/0178298 A1 | 7/2008 | Arai et al. | |
| 2008/0281884 A1* | 11/2008 | Subrahmanyam | G06F 8/61 |
| 2009/0125625 A1 | 5/2009 | Jeong-Min et al. | |
| 2009/0164994 A1 | 6/2009 | Vasilevsky et al. | |
| 2009/0293054 A1 | 11/2009 | Sheehan et al. | |
| 2010/0023640 A1 | 1/2010 | Vinson et al. | |
| 2010/0161823 A1 | 6/2010 | Soon-Heung et al. | |
| 2010/0198906 A1 | 8/2010 | Radhakrishnan et al. | |
| 2010/0306270 A1* | 12/2010 | McDiarmid | G06F 8/61 707/796 |
| 2010/0333085 A1* | 12/2010 | Criddle | G06F 8/60 717/178 |
| 2011/0029968 A1* | 2/2011 | Sanders | G06F 8/61 717/178 |
| 2011/0106937 A1 | 5/2011 | Upham et al. | |
| 2012/0066677 A1 | 3/2012 | Tang | |
| 2012/0158819 A1* | 6/2012 | Anderson | G06F 8/60 709/202 |
| 2012/0259958 A1 | 10/2012 | Tsui et al. | |
| 2012/0283017 A1* | 11/2012 | Ahiska | A63F 13/12 463/40 |
| 2012/0297311 A1 | 11/2012 | Duggal | |
| 2013/0159381 A1 | 6/2013 | Morgan | |
| 2013/0159543 A1 | 6/2013 | Yandek et al. | |
| 2013/0212222 A1 | 8/2013 | Outlaw | |
| 2015/0106440 A1 | 4/2015 | Morgan | |

FOREIGN PATENT DOCUMENTS

| | | |
|---|---|---|
| CN | 102014158 | 4/2011 |
| CN | 102236554 A | 11/2011 |
| JP | 2004-502236 | 1/2004 |
| JP | 2011-159295 | 8/2011 |
| KR | 20090000498 | 1/2009 |
| RU | 2007111490 | 11/2008 |
| WO | WO 0201350 A1 | 1/2002 |
| WO | 2010079772 | 7/2010 |
| WO | 2013090101 | 6/2013 |

OTHER PUBLICATIONS

Cui, et al., "Virtual File System for Streaming Delivery of Software", In Journal of Chinese Computer Systems, vol. 32, Issue 11, Nov. 30, 2011, pp. 2182-2186.

Gokhale, et al., "KVZone and the Search for a Write-optimized Key-value Store", In Proceedings of the 2nd USENIX Conference on Hot Topics in Storage and File Systems, Jun. 22, 2010, 5 pages.

Yu, et al., "Applications of a Feather-weight Virtual Machine", In Proceedings of the Fourth ACM SIGPLAN/SIGOPS International Conference on Virtual Execution Environments, Mar. 5-7, 2008, pp. 171-180.

U.S. Appl. No. 13/327,699, dated Apr. 28, 2014, Notice of Allowance.

"Supplementary European Search Report Received For European Patent Application No. 12857400.1", dated Feb. 25, 2016, 11 Pages.

"Office Action Issued in Mexican Patent Application No. MX/a/2014/007166", dated Aug. 3, 2016, 2 Pages.

Friedland, et al., "Towards a Demand Driven, Autonomous Processing and Streaming Architecture", In Proceedings of the 12th IEEE International Conference and Workshops on Engineering or Computer-Based Systems, Apr. 4-7, 2005, pp. 473-480.

Olzak, Tom, "Desktop Application Virtualization and Application Streaming: Function and Security Benefits" Published Aug. 2007, Available at <<http://www.infosecwriters.com/text_resources/pdf/Desktop_Virtualization_Tolzak.pdf>>.

"Deploy Virtual Applications to Image", Available at least as early as Oct. 31, 2011, Available at <<http://www.tmurgent.com/AppV_DeployNPublishApp/With_VDI/Deploy_Virtual_Applications_To_Cache.aspx>>.

First Office Action and Search Report Issued in Chinese Patent Application No. 201210545994.6, dated Feb. 4, 2015, 12 Pages.

"Second Office Action Issued in Chinese Patent Application No. 201210545994.6", dated Oct. 16, 2015, 7 Pages.

"Supplementary Search Report Issued in European Patent Application No. 12857657.6", dated Oct. 6, 2015, 9 Pages.

"Third Office Action Issued in Chinese Patent Application No. 201210545994.6", dated Feb. 14, 2016, 6 Pages.

Office Action dated Apr. 15, 2014 cited in U.S. Appl. No. 13/327,695.

Notice of Allowance dated Sep. 12, 2014 cited in U.S. Appl. No. 13/327,695.

Office Action dated Apr. 29, 2016 cited in U.S. Appl. No. 14/577,767.

"Fourth Office Action Issued in Chinese Patent Application No. 201210545994.6", dated Jul. 4, 2016, 7 Pages.

"Office Action Issued in Russian Patent Application No. 2014123714", dated Sep. 15, 2016, 4 Pages (w/o English Translation).

"Notice of Allowance Issued in Russian Patent Application No. 2014123714", dated Nov. 23, 2016, 14 Pages.

(56) References Cited

OTHER PUBLICATIONS

Japanese Office Action issued in JP Patent Application No. 2014-547293 dated Feb. 21, 2017.
Japanese Office Action issued in JP Patent Application No. 2014-547539 dated Mar. 1, 2017.
Office Action dated Jan. 20, 2017 cited in U.S. Appl. No. 14/577,767.

* cited by examiner

FAST APPLICATION STREAMING USING ON-DEMAND STAGING

CROSS-REFERENCE TO RELATED APPLICATIONS

This application is a continuation of U.S. patent application Ser. No. 13/327,699 filed on Dec. 15, 2011, entitled "FAST APPLICATION STREAMING USING ON-DEMAND STAGING," which issued as U.S. Pat. No. 8,832, 296 on Sep. 9, 2014, and which application is expressly incorporated herein by reference in its entirety.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be provided by an application server. These applications may be provided to thin client computer systems or other networked computer systems. These applications may be run on the application server, and merely presented to the user via a user interface on the user's computer system. As such, these types of applications are referred to as virtual applications. Application servers may host large numbers of these virtual applications, each application being accessed by a different user. The virtual applications are staged on the user's computer systems, loading (at least temporarily) large portions of the virtual applications onto the user's local hard drive or other data store.

BRIEF SUMMARY

Embodiments described herein are directed to rapidly launching a virtual software application using on-demand file staging, rapidly launching a virtual software application using on-demand registry staging and to rapidly publishing a virtual software application using on-demand staging. In one embodiment, a computer system creates a high-level file listing that includes a list of specified high-level data files and directories that are part of a virtual application package. The computer system receives an indication from an application user that the virtual application is to be accessed and dynamically creates sparse data files for those data files that are to be accessed based on the received indication. The sparse files include file names and file sizes for those data files that are to be accessed. The data corresponding to the sparse data files is stored in a remote data store. Then, upon determining that the virtual application is attempting to access the sparse data files, the computer system dynamically streams the data corresponding to the sparse data files on demand from the remote data store.

In another embodiment, a computer system creates a high-level registry file listing that includes a listing of specified, high-level registry files that are to be used by the virtual software application. The computer system receives an indication from an application user that the virtual application is to be accessed and dynamically creates those registry files listed in the high-level listing that are to be accessed based on the received indication. In this manner, the created registry files are written into the client computer system registry. Then, upon determining that the application is attempting to access additional registry files, the computer system dynamically creates the additional registry files in the client computer system registry on demand.

In yet another embodiment, an administrative computer system receives an input from a computer administrator indicating that various virtual software applications are to be published on client computer systems under the administrator's control. Then, in response to the received input, the administrative computer system publishes the virtual software application to the various different client computer systems. The publishing includes creating, on at least one of the client computer system, a high-level file listing that includes a list of specified high-level data files and directories that are part of a virtual application package, and also creating sparse data files on demand for those data files that are requested by the virtual software application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Figure 1:
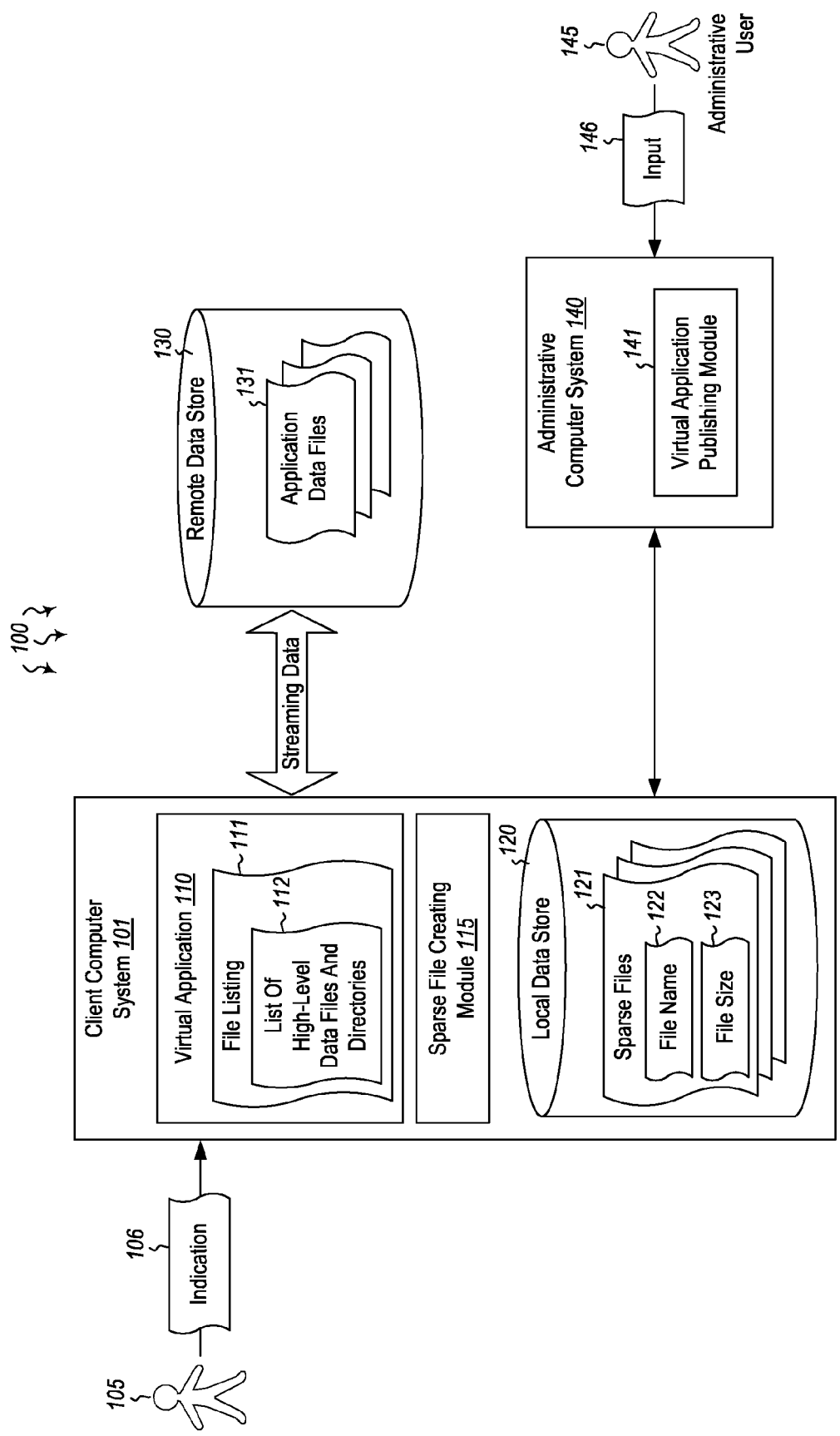
FIG. 1 illustrates a computer architecture in which embodiments of the present invention may operate including rapidly launching a virtual software application using on-demand file staging.

Embodiments described herein are directed to rapidly launching a virtual software application using on-demand file staging, rapidly launching a virtual software application using on-demand registry staging and to rapidly publishing a virtual software application using on-demand staging. In one embodiment, a computer system creates a high-level file listing that includes a list of specified high-level data files and directories that are part of a virtual application package. The computer system receives an indication from an application user that the virtual application is to be accessed and dynamically creates sparse data files for those data files that are to be accessed based on the received indication. The sparse files include file names and file sizes for those data files that are to be accessed. The data corresponding to the sparse data files is stored in a remote data store. Then, upon determining that the virtual application is attempting to access the sparse data files, the computer system dynamically streams the data corresponding to the sparse data files on demand from the remote data store.

In another embodiment, a computer system creates a high-level registry file listing that includes a listing of specified, high-level registry files that are to be used by the virtual software application. The computer system receives an indication from an application user that the virtual application is to be accessed and dynamically creates those registry files listed in the high-level listing that are to be accessed based on the received indication. In this manner, the created registry files are written into the client computer system registry. Then, upon determining that the application is attempting to access additional registry files, the computer system dynamically creates the additional registry files in the client computer system registry on demand.

In yet another embodiment, an administrative computer system receives an input from a computer administrator indicating that various virtual software applications are to be published on client computer systems under the administrator's control. Then, in response to the received input, the administrative computer system publishes the virtual software application to the various different client computer systems. The publishing includes creating, on at least one of the client computer system, a high-level file listing that includes a list of specified high-level data files and directories that are part of a virtual application package, and also creating sparse data files on demand for those data files that are requested by the virtual software application.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes client computer system 101. Client computer system 101 may be any type of local or distributed computer system, including a cloud computer system. The client computer system includes various modules and other elements for performing specific tasks. For instance, the sparse file creating module 115 may create sparse files, as will be explained further below. The client computer system includes one or more virtual applications 110. Each virtual application may be run from an application server, or from a remote data store. The application may appear to be a locally installed application, even though it is not installed locally. The application's files 131 may be streamed from the remote data store 130 as needed.

Initially, when a virtual application has been published to a client computer system (e.g. 101), the virtual application contains a file listing 111. The file listing includes a list of high-level data files and directories 112. Accordingly, some, but not all, of the application's corresponding files are listed in the file listing. The actual files are not stored on the local data store 120 (e.g. a hard disk); rather the file listing is stored. As files are requested by the virtual application, sparse files are created for each of the requested files. The term "sparse file" as used herein refers to a placeholder that includes the file's name 122 and size 123. Accordingly, because the sparse file exists, local file system calls for the file will return positive, indicating that the file exists locally on disk. The file's actual data is not, however, stored on disk. The file's actual data 131 is stored on the remote data store 130 until requested by the virtual application. When the data is requested, it is streamed to the local data store and, at least in some embodiments, is stored for subsequent use.

As new files are needed by the application (for example, a user accesses a new feature of the application) the sparse file creating module 115 will create sparse files for each requested file. These sparse files may be created in a tree/directory structure. Eventually, (if all of the application's features have been accessed) all the application's files and directories will be stored on the local data store 120. It should be noted that files and directories that are never accessed are never created on disk (locally) and thus do not consume disk space resources. In some cases, an administrator (e.g. administrative user 145) can override the above-described on-demand staging and choose to pre-load all the files on disk. In such cases, the application's data files are exhaustively streamed and stored locally.

Various embodiments will be described below including the following: 1) Rapid publishing, where the publishing operation completes substantially immediately. Subsequent data requests result in the generation of sparse files and directories. 2) Rapid launch of virtual applications. The virtual application's files do not need to exist locally before the application can be launched. The sparse files are created on demand and the data is filled in (streamed) on demand. 3) First time access penalty only: once the data files have been created and streamed, they are no longer sparse and require no further updates or access. A low-level streaming filter no longer intercepts and processes file system accesses. Subsequent usage may include data file system blending as the rest of the virtualization software stack blends the namespaces of the virtual application with those of the local file system. 4) Disk space resources are consumed only if needed. If the file or directory is never accessed, the data file is never created on disk, even sparsely. If the data file is accessed via an enumeration but nothing is read, the file exists sparsely only (i.e. no disk space resource are consumed). Only when the file content is read any significant disk space consumed.

Similar to data files, an operating system's registry can be dynamically populated using sparse files and data streaming. A lightweight listing of an application's registry content is downloaded to the client computer system. Application publishing operations complete as soon as the listing has been downloaded. A background process on the client computer system will load the registry content into the system's registry. Note that there is a difference between the registry and the file. Whereas the files and directories are created on-demand, their content is never streamed to the target machine unless accessed (or unless the administrator overrides staging, and pre-loads the package content). The registry may be pre-loaded onto the client computer system, but in an asynchronous manner relative to the publishing operation.

When an application package is published on a target machine, various registry files may be copied locally the first time it is accessed. The registry file is a well-formed registry hive file of standard format. Since it is a file, it is first created using the on-demand staging method described above. Once created, it is mounted (and thus its content is streamed) into the client computer system's native registry so that its content can be read and copied to pre-defined locations on the client computer system 101.

Application virtualization software may be used to blend operating system's native registry with the virtual application's registry so that it appears unified to the virtual application 110. On first access, various registry keys used for initializing the virtual application are created. Eventually, but asynchronously to both the publishing operation and virtual application usage, the package registry content will be loaded into the target machine's registry Embodiments described herein encompass one or more of the following elements: 1) Inheritance of the client computer system's security. For instance, one computer system may have different registry keys than another. Each computer system's local keys are used rather than overriding all client computer system keys with a single application package. 2) Access to the client computer system's registry is as usual. Any existing registry protections exist, each with per-machine granularity. 3) Rapid publishing operation. The publishing operation completes at once, without waiting even for the sparse registry hive file to be created on disk. 4) Rapid registry content availability. The first time the virtual application launches, the registry file is mounted. Since this is the first access, it is created sparsely on disk and streamed at this time. 5) Rapid first launch of virtual application. The only synchronous operation involved is the streaming to disk and loading of the application package registry hive file. Registry access is subsequently monitored. Any access to content not yet copied to its destination in the target machine's registry is moved up in priority. 6) Once each registry file is copied to its target destination (in the registry of the client computer system), additional copying is unnecessary. Once the application package registry hive file has been copied, namespaces that need blending may be blended by the virtualization software. These aspects will be described further below with regard to methods 200, 300 and 400 of FIGS. 2, 3 and 4, respectively.

Figure 2:
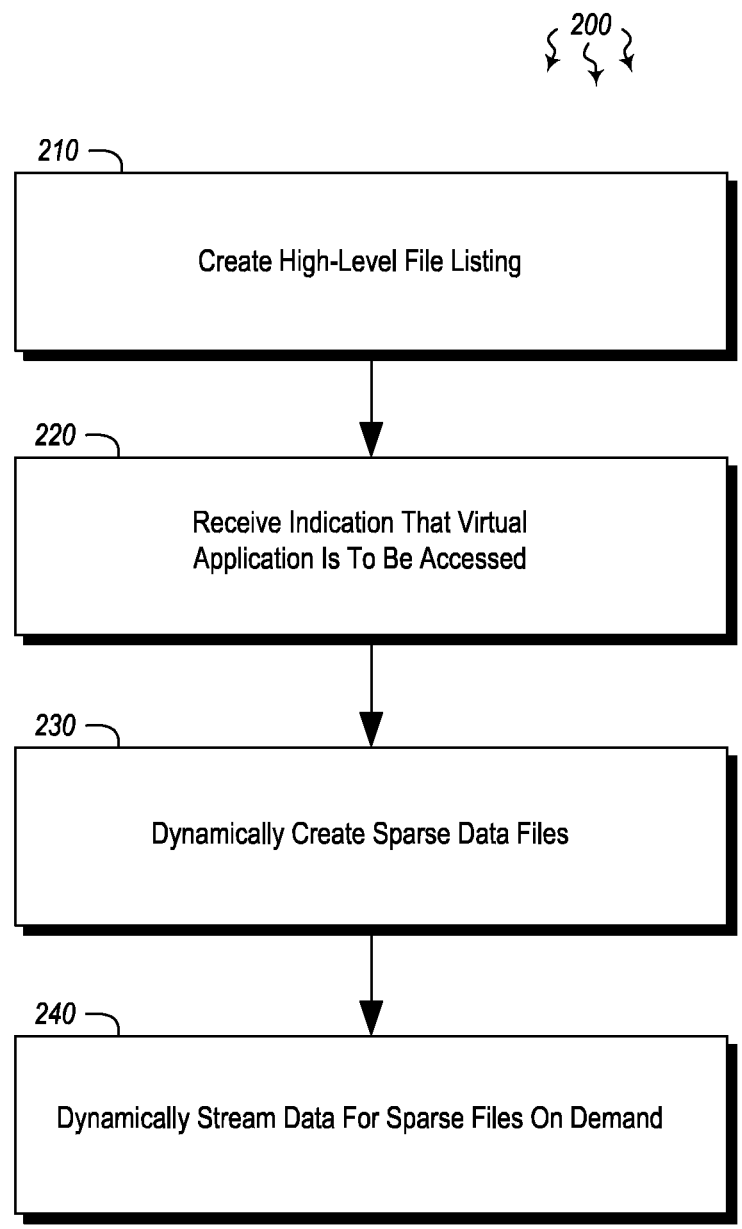
FIG. 2 illustrates a flowchart of an example method for rapidly launching a virtual software application using on-demand file staging.
Figure 3:
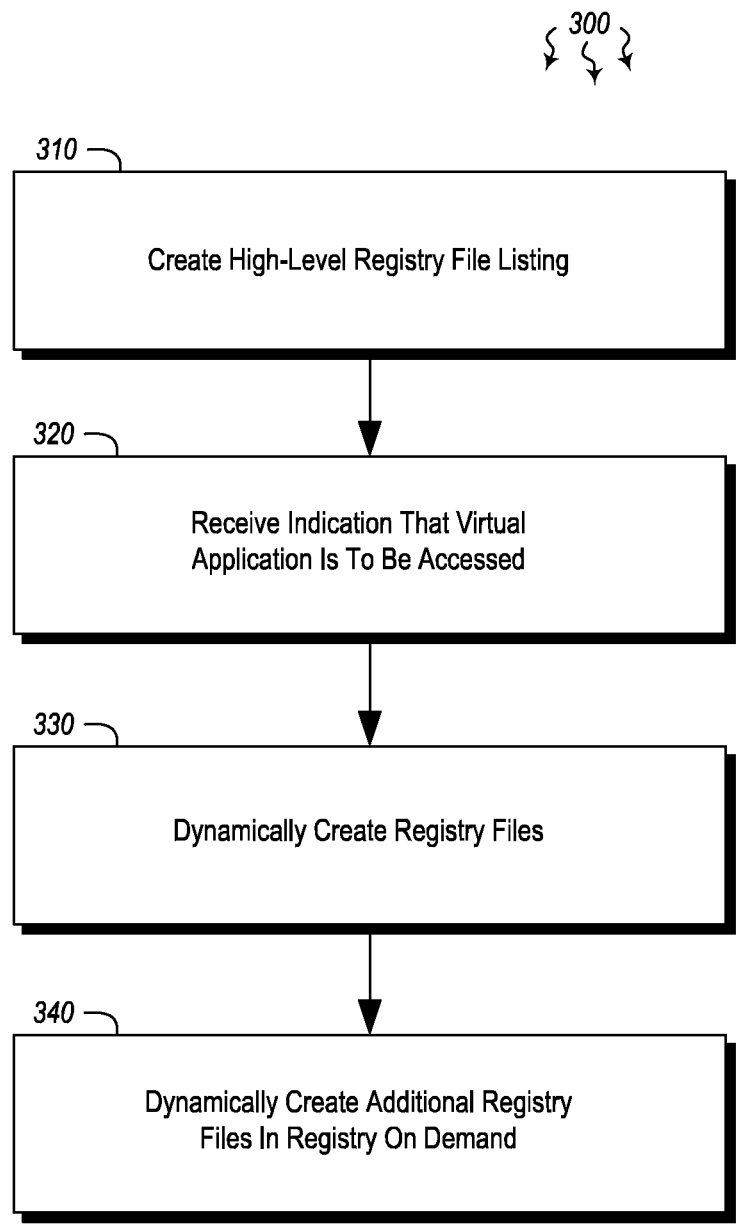
FIG. 3 illustrates a flowchart of an example method for rapidly launching a virtual software application using on-demand registry staging.
Figure 4:
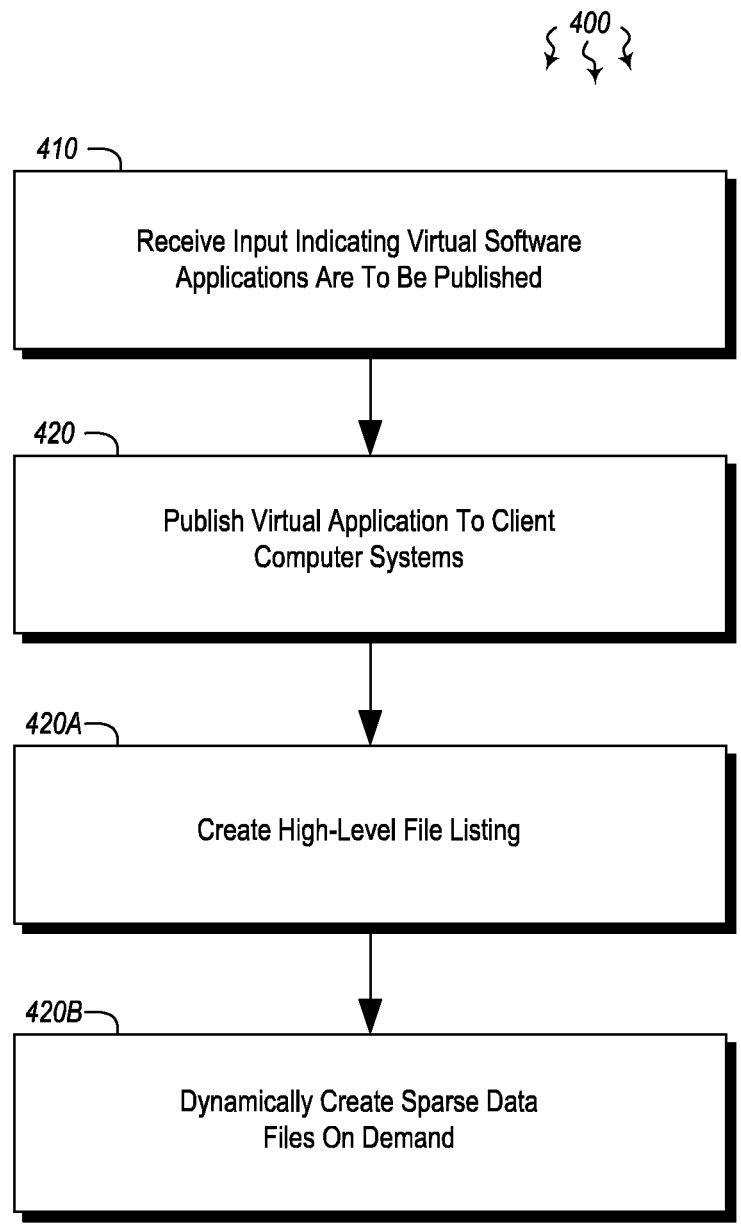
FIG. 4 illustrates a flowchart of an example method for rapidly publishing a virtual software application using on-demand staging.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for rapidly launching a virtual software application using on-demand file staging. The method 200 will now be described with frequent reference to the components and data of architecture 100.

Method 200 includes an act of creating, on the client computer system, a high-level file listing that includes a list of specified high-level data files and directories that are part of a virtual application package (act 210). For example, file listing 111 may be created on computer system 101. The file listing includes a list of high-level data files and directories that are part of a given virtual application 110. The files in list 112 may include a listing of files that are part of the application's user interface (UI), a listing of files that are part of the application's initiation process, part of its main functionality or any other part of the application. Accordingly, the list of high-level data files and directories 112 may range anywhere from a very short list to a very long list, depending on the application or depending on administrator settings. Each application may have a set of files that belong to that package. As such, the file listing 111 may simply include the files of that application package, or a subset of the package's files.

Method 200 also includes an act of receiving an indication from an application user that the virtual application is to be accessed (act 220). For example, the client computer system 101 may receive indication 106 from user 105 indicating that virtual application 110 is to be accessed. In some cases, this indication may be received when the application is already running. In other cases, the indication may indicate that the application is to be initiated, or, more specifically, that the application's user interface is to be initiated. In such cases, sparse files are dynamically created for those files that are to be used in initializing the virtual application.

As mentioned previously, sparse files are placeholders that only include the corresponding file's file name 122 and file size 123. The sparse file creating module 115 may dynamically create sparse data files 121 for those data files that are to be accessed based on the received indication (whether for initiating the program or for accessing a feature of the program while it is already running). Sparse files are dynamically generated for each data file that is to be accessed in response to the user's indication 106. The sparse files are created locally on the client computer system, in local data store 120 (act 230). Each sparse file has a corresponding data file, whether stored locally or on a remote data store 130. In some embodiments, when a file is to be accessed for the first time, a sparse file for that file is created on the local data store. Then, any initial requests by the file system will read the sparse file and then think the file is stored locally. When a data read request is received at the file system to actually read the file's data, a request is sent to the remote data store (e.g. the cloud) and the appropriate application file 131 is retrieved and streamed to the client computer system's local data store. The file system then reads the data from the local data store for this and any subsequent data requests.

In some cases, the client computer system may determine that the indication 106 from the user 105 indicates that a specified directory is to be accessed. In such cases, the sparse file creating module 115 may dynamically create sparse files for the specified directory and its immediate contents. As such, the sparse files would include any data files in the specified directory, as well as the names of any sub-folders. Sparse files would not be created, however, for data files or sub-folders under the specified directory's sub-folders. In this manner, sparse files are only created for data files that have been accessed (or for which access has been requested). If the user requests a specified file that is to be accessed and the file is located in a sub-directory, the sparse file creating module may dynamically create sparse files for the specified data files' root directory and each intervening sub-directory.

Then, as indicated above, when the client computer system's file system determines that the virtual application 110 is attempting to access one or more of the sparse data files 121, the client computer system requests that the data files corresponding to the accessed sparse files be dynamically streamed on demand from the remote data store (act 240). These data files may be streamed singly or in plural, in series or in parallel. The files may be stored and accessed locally, or may be streamed directly to the virtual application. In cases where the files are stored on the local data store, any subsequent access requests may be satisfied by accessing the data files locally. Virtual application registry files may also be created in a similar manner. Sparse registry files may be dynamically created for those registry files that are accessed by the virtual application. This will be explained in greater detail below with regard to FIG. 3.

It should also be noted that an administrative user 145 may indicate that on-demand staging is to be overridden for one or more specified data files or virtual applications. For instance, if an application is very small, the administrator may specify that on-demand staging is to be overridden and that the specified data files are to be preloaded locally on the local data store. These files or applications for which the administrator has overridden on-demand staging may be accessed normally by the file system as if the application were locally installed. Furthermore, when virtual application files are stored on the local data store (either after being streamed or because of an override), the local file system namespaces may be blended with those used by the virtual application for direct use by the virtual application.

Figure 5:
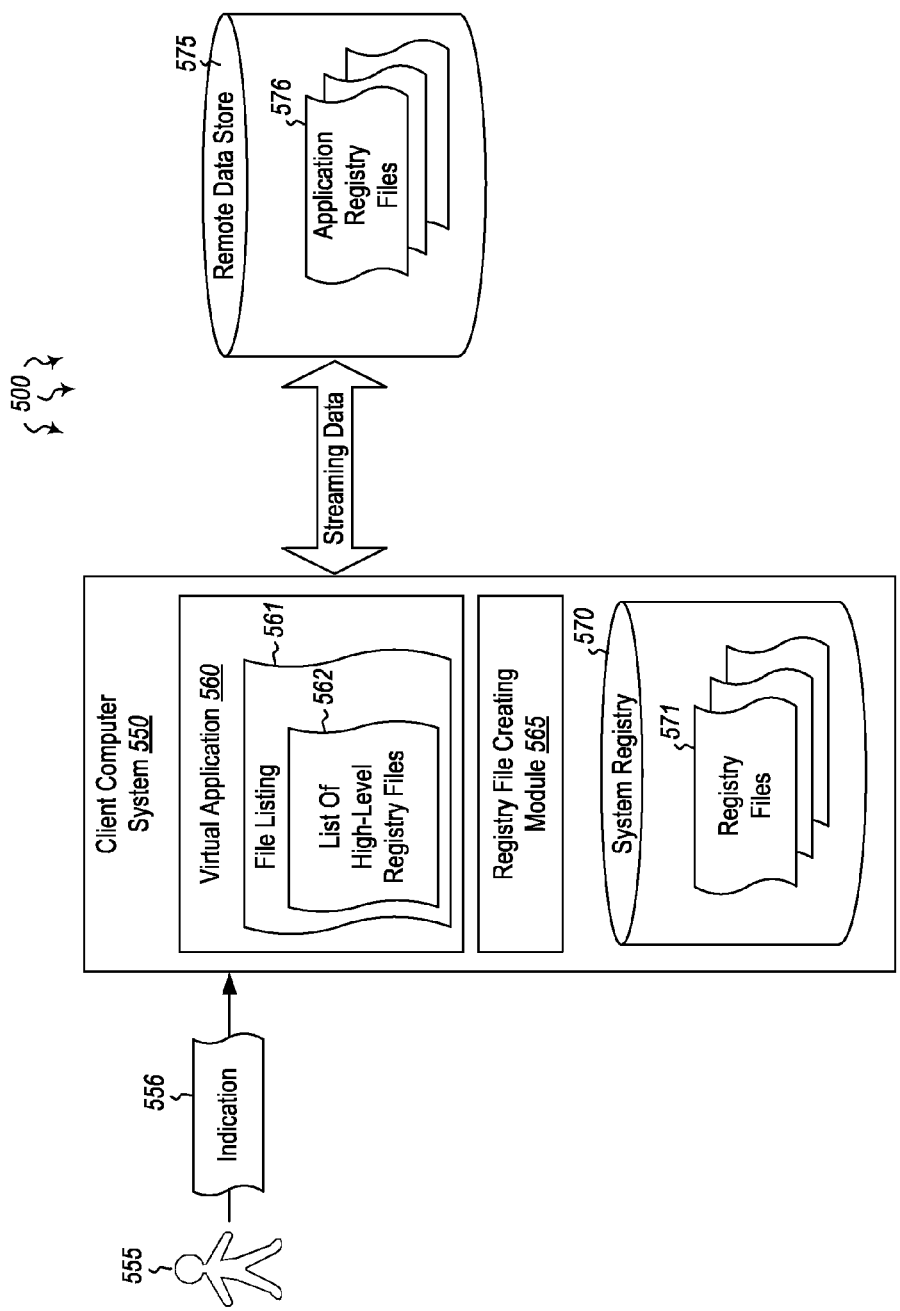
FIG. 5 illustrates a computer architecture in which virtual software applications are rapidly launched using on-demand registry staging.

FIG. 3 illustrates a flowchart of a method 300 for rapidly launching a virtual software application using on-demand registry staging. The method 300 will now be described with frequent reference to the components and data of environment 500 of FIG. 5.

Method 300 includes an act of creating, on the client computer system, a high-level registry file listing that includes a listing of specified, high-level registry files that are to be used by the virtual software application (act 310). For example, registry file listing 561 may be created on client computer system 550. The file listing includes a list of high-level registry files 562 that are to be used by the virtual application 560. As with file listing 111, the registry file listing may include all or a portion of those registry files that will be used by the virtual application. The client computer system may receive an indication 556 from an application user 555 that the virtual application is to be accessed (act 320). When the indication is received, the application may not yet be running, in which case the indication is requesting that the application be initiated. If the virtual application is already running when the indication is received, then the indication may be requesting functionality provided by the application that has not yet been used.

In response to the received indication 556, the registry file creating module 565 may dynamically create those registry files listed in the high-level listing 562 that are to be accessed based on the received indication (act 330). In this manner, the dynamically created registry files are written into the client computer system registry 570. Thus, for each registry file 571 that is to be accessed, a corresponding sparse file may be created. Then, as the data, values or keys from the registry file 576 are to be accessed, they are streamed from the remote data store 575. Registry staging may, at least in some cases, be combined for multiple different virtual software applications. As such, registry files for a plurality of virtual applications may be dynamically streamed from the remote data store simultaneously. It should also be noted that the dynamic creation of registry files may be carried out as a background process on the client computer system.

In response to determining that the application 560 is attempting to access additional registry files, registry file creating module may dynamically create the additional registry files in the client computer system registry 570 on demand (act 340). In cases where the application is first being initialized, the registry files are dynamically created for those files that are to be used in initializing the application. In cases where the application is already running, the registry files 571 are dynamically created for use in the newly accessed features. If a dynamically created registry file is (for whatever reason) no longer accessible, the registry file containing the required data for the key that the application is requesting is streamed to the client computer system on demand. Moreover, any requests from the virtual application may be intercepted at the registry key level. Then, registry keys may be created for each data request on demand using the data from the dynamically created registry file. Over time, each registry file for the application will be dynamically created and stored in the local system registry 570. Each of these registry files may be dynamically created (or, in some cases, preloaded if so specified by the administrator) in an asynchronous manner.

FIG. 4 illustrates a flowchart of a method 400 for rapidly publishing a virtual software application using on-demand staging. The method 400 will now be described with frequent reference to the components and data of architecture 100.

Method 400 includes an act of receiving an input from a computer administrator indicating that one or more virtual software applications are to be published on one or more client computer systems (act 410). For example, administrative computer system 140 may receive input 146 from administrative user 145. The input may indicate that various specified virtual applications 110 are to be published on client computer system 101 (and any number of other client computer systems). In response to the received input, virtual application publishing module 141 may publish the virtual software application to the client computer systems (act 420). The publishing includes an act of creating, on at least client computer system 101, a high-level file listing 111 that includes a list of specified high-level data files and directories 112 that are part of a virtual application package (act 420A). The publishing also includes an act of the sparse file creating module 115 creating one or more sparse data files 121 on demand for those data files 131 requested by the virtual software application 110 (act 420B).

In this manner, an administrative user may publish an application to a plurality of different computer systems. The administrative user need only send the indication, and an icon for the application may appear on each computer system to which the application was published. Once the user clicks on the icon to initiate the application, the on-demand staging begins, as described above. Each file used to initialize the application has a corresponding sparse file created. When the actual data is requested, the data is streamed from the remote data store and either stored locally or streamed directly to the virtual application. Then, once the application is running, any subsequent virtual application files that are accessed will have corresponding sparse files created and will be streamed from the remote data store. Furthermore, when the application is first published, a high-level registry file listing may be created that includes a listing of specified, high-level registry files that are to be used upon initialization of the application. Then, those registry files listed in the high-level listing that are to be accessed to initialize the program or to access a new portion of the application are dynamically created and are written into the client computer system registry. In this manner, applications may be published substantially instantaneously, and updates to the application may be dynamically published at the indication of the administrative user.

Accordingly, methods, systems and computer program products are provided which rapidly launch a virtual software application using on-demand file staging. Moreover, methods, systems and computer program products are provided which rapidly launch an application using on-demand registry staging and rapidly publish a virtual software application using on-demand staging.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system; comprising:
one or more processors; and
one or more computer-readable hardware storage devices having stored thereon computer-executable instructions that are executable by the one or more processors and that cause the computer system to perform on-demand file staging by causing the computer system to:
identify a virtual software application that is to be accessed by the computer system;
detect that the virtual software application is attempting, for a first time, to access a data file located at a server computer system remotely from the computer system;
in response to the first time attempt to access the data file, dynamically create a sparse data file at the computer system, wherein the sparse data file includes at least a file name and a file size that is created in a directory structure stored by the computer system;
in response to a call for the data file by a local file system of the computer system, return a positive reply that the data file exists locally on the computer system, even though it does not yet exist locally on the computer system; and
in response to a request for particular data contained in the data file, subsequent to the sparse data file being created, stream the particular data from the server computer system to the computer system.

2. The computer system of claim 1, wherein the sparse data file is created only in response to the first time attempt to access the data file.

3. The computer system of claim 1, wherein a low-level streaming filter intercepts and redirects one or more access attempts of the virtual software application.

4. The computer system of claim 1, wherein an initial publishing of the virtual software application to the computer system comprises:
   obtaining a listing of files that are to be used during the initial publishing of the virtual software application; and
   streaming the files to the computer system, wherein the files are given a streaming priority that is higher than other content that is being streamed to the computer system.

5. The computer system of claim 1, wherein a second data file is also associated with the virtual software application, and wherein a sparse data file that corresponds to the second data file is not created at the computer system until the virtual software application attempts to access the second data file.

6. The computer system of claim 1, wherein the file name and the file size of the sparse data file corresponds to the data file.

7. The computer system of claim 1, wherein the data file is associated with a new function of the virtual software application, the new function having not been previously used by the virtual software application.

8. The computer system of claim 1, wherein the on-demand file staging is overrideable.

9. The computer system of claim 1, wherein the data file comprises multiple data sets, and wherein the particular data that is streamed to the computer system is included within the multiple data sets.

10. The computer system of claim 1, wherein the virtual software application accesses the sparse data file for enumeration requests.

11. The computer system of claim 1, wherein execution of the computer-executable instructions further causes the computer system to:
   detect that the virtual software application is attempting to access a different data file, wherein the different data file is located locally to the computer system, and wherein the attempt to access the different data file is a first attempt by the virtual software application; and
   in response to the first attempt to access the different data file, create a different sparse data file at the computer system, wherein the different sparse data file includes at least some data that corresponds to the different data file.

12. The computer system of claim 1, wherein execution of the computer-executable instructions further causes the computer system to:
   determine that the data file is located in a sub-directory; and
   in addition to creating the sparse file for the data file, create sparse files for the following: (1) a root directory of the data file and (2) each intervening sub-directory between the data file and the root directory.

13. A method, implemented by a computer system that includes one or more processors, for performing on-demand file staging, the method comprising:
   identifying a virtual software application that is to be accessed by the computer system;
   detecting that the virtual software application is attempting, for a first time, to access a data file located at a server computer server remotely from the computer system;
   in response to the first time attempt to access the emote-data file, creating a sparse data file at the computer system, wherein the sparse data file includes at least a file name and a file size that is created in a directory structure stored by the computer system;
   in response to a call for the data file by a local file system of the computer system, returning a positive reply that the data file exists locally on the computer system even though it does not yet exist locally on the computer system; and
   in response to a request for particular data contained in the data file, subsequent to the sparse data file being created, streaming the particular data from the server computer system to the computer system.

14. The method of claim 13, wherein a low-level streaming filter intercepts and redirects one or more access attempts of the virtual software application.

15. The method of claim 13, wherein an initial publishing of the virtual software application to the computer system comprises:
   obtaining a listing of files that are to be used during the initial publishing of the virtual software application; and
   streaming the files to the computer system, wherein the files are given a streaming priority that is higher than other content that is being streamed to the computer system.

16. The method of claim 13, wherein a second data file is also associated with the virtual software application, and wherein a sparse data file that corresponds to the second data file is not created at the computer system until the virtual software application attempts to access the second data file.

17. The method of claim 13, wherein the data file comprises multiple data sets, and wherein the particular data that is streamed to the computer system is included within the multiple data sets.

18. One or more hardware storage devices having stored thereon computer-executable instructions that are executable by one or more processors of a computer system and that cause the computer system to perform on-demand file staging by causing the computer system to:
   identify a virtual software application that is to be accessed by the computer system;
   detect that the virtual software application is attempting, for a first time, to access a data file located at a server computer system remotely from the computer system;
   in response to the first time attempt to access the data file, create a sparse data file at the computer system, wherein the sparse data file includes at least a file name and a file size that is created in a directory structure stored by the computer system;
   in response to a call for the data file by a local file system of the computer system, return a positive reply that the data file exists locally on the computer system even though it does not yet exist locally on the computer system; and
   in response to a request for particular data contained in the data file, subsequent to the sparse data file being created, stream the particular data from the server computer system to the computer system.

19. The one or more hardware storage devices of claim 18, wherein at least some files of the virtual software application are preloaded locally onto the computer system.

20. The one or more hardware storage devices of claim 18, wherein a low-level streaming filter intercepts and redirects one or more access attempts of the virtual software application.

21. The one or more hardware storage devices of claim 18, wherein an initial publishing of the virtual software application to the computer system comprises:
   obtaining a listing of files that are to be used during the initial publishing of the virtual software application; and
   streaming the files to the computer system, wherein the files are given a streaming priority that is higher than other content that is being streamed to the computer system.

* * * * *